(12) United States Patent
Wang et al.

(10) Patent No.: US 12,423,255 B1
(45) Date of Patent: Sep. 23, 2025

(54) PROGRAMMABLE TRAFFIC INGRESS DIRECTION FOR REDUCED LATENCY IN A DPU

(71) Applicant: Advanced Micro Devices, Inc., Santa Clara, CA (US)

(72) Inventors: Weihuang Wang, Santa Clara, CA (US); Alessandro Fulli, Boxborough, MA (US); Alexandru Seibulescu, Santa Clara, CA (US); Kecheng Qian, Santa Clara, CA (US); Kit Chiu Chu, Freemont, CA (US); Mahesh Machineni, Santa Clara, CA (US); Michael Brian Galles, Los Altos, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 23 days.

(21) Appl. No.: 18/608,605

(22) Filed: Mar. 18, 2024

(51) Int. Cl.
*G06F 13/28* (2006.01)

(52) U.S. Cl.
CPC .................................. *G06F 13/28* (2013.01)

(58) Field of Classification Search
None
See application file for complete search history.

(56) References Cited

U.S. PATENT DOCUMENTS

| | | | |
|---|---|---|---|
| 9,118,576 B2* | 8/2015 | Roitshtein | H04L 69/22 |
| 10,122,735 B1* | 11/2018 | Wohlgemuth | H04L 63/1408 |
| 2012/0177047 A1* | 7/2012 | Roitshtein | H04L 49/1523 370/392 |
| 2017/0078219 A1* | 3/2017 | Connor | H04L 47/122 |

* cited by examiner

*Primary Examiner* — Michael Sun
(74) *Attorney, Agent, or Firm* — Patterson + Sheridan, LLP (57) ABSTRACT

Embodiments herein describe selectively bypassing a networking pipeline in a DPU. For example, instead of a packet being processed by both the networking pipeline and a DMA pipeline in the DPU, the packet is only processed by the DMA pipeline. This can reduce latency for packets that do not have network-heavy tasks associated with them, such Remote Direct Memory Access (RDMA) over Converged Ethernet (RoCE) packets. In addition, the DPU can perform load balancing between different instances of the pipelines in the DPU.

20 Claims, 6 Drawing Sheets

PROGRAMMABLE TRAFFIC INGRESS DIRECTION FOR REDUCED LATENCY IN A DPU

TECHNICAL FIELD

Examples of the present disclosure generally relate to reducing latency of a packet through a data processing unit (DPU) by selectively bypassing a networking pipeline.

BACKGROUND

A DPU can include different types of pipelines for processing received network packets. For example, the DPU may be in a network interface controller/card (NIC) such as a SmartNIC that processes packets before they are forwarded to a host (e.g., a host central processing unit (CPU) or graphics processing unit (GPU)). Currently, DPUs can have two types of pipelines: networking pipelines which perform networking tasks such as combining packets that were subdivided to be compatible with a maximum transmission unit (MTU) or for dealing with one or more host operating systems, drivers, and/or message descriptor formats in host memory, and direct memory access (DMA) pipelines which perform memory reads and writes. A received packet is first processed by a networking pipeline before being processing by a DMA pipeline.

SUMMARY

One embodiment described herein is a data processing unit (DPU) that includes a networking pipeline, a direct memory access (DMA) pipeline, a parser circuit configured to parse a received packet to identify a packet header vector (PHV), and match circuitry. The match circuitry is configured to, based on receiving the PHV, determine that the received packet should bypass the networking pipeline and edit the PHV to indicate the received packet should be transmitted to the DMA pipeline.

One embodiment described herein is a method that includes parsing a received packet to identify a packet header vector (PHV), determining that the received packet should bypass a networking pipeline based on data in the PHV, and editing the PHV to indicate the received packet should be transmitted to a DMA pipeline rather than the networking pipeline.

One embodiment described herein is a NIC that includes a networking pipeline, a DMA pipeline, a parser circuit configured to parse a received packet to identify a PHV, and match circuitry. The match circuitry is configured to, based on receiving the PHV, determine that the received packet should bypass the networking pipeline and edit the PHV to indicate the received packet should be transmitted to the DMA pipeline.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe selectively bypassing a networking pipeline in a DPU. For example, instead of a packet being processed by both the networking pipeline and a DMA pipeline in the DPU, certain packets are only processed by the DMA pipeline. This can reduce latency for packets that do not have network-heavy tasks associated with them, such as Remote Direct Memory Access (RDMA) over Converged Ethernet (ROCE) packets. Advantageously, RDMA packets can be identified and then skip the networking pipelines in the DPU, thereby saving compute resources, power, and reducing latency.

In addition to selectively bypassing the networking pipeline, the embodiments herein can also perform load balancing between different instances of the pipelines. For example, a DPU can have multiple networking pipelines and multiple DMA pipelines. In one embodiment, the same circuitry in the DPU that determines whether a packet should skip the networking pipelines can also evaluate information such as a flow identification (ID), the destination, or the source associated with a packet to assign the packet to a particular one of the networking pipelines (assuming it should be processed by both the networking and DMA pipelines) or a particular one of the DMA pipelines (assuming it should be processing by only a DMA pipeline). For example, a first range of flow IDs can be assigned to a first networking pipeline, a second range of flow IDs can be assigned to a second networking pipeline, and so forth.

Figure 1:
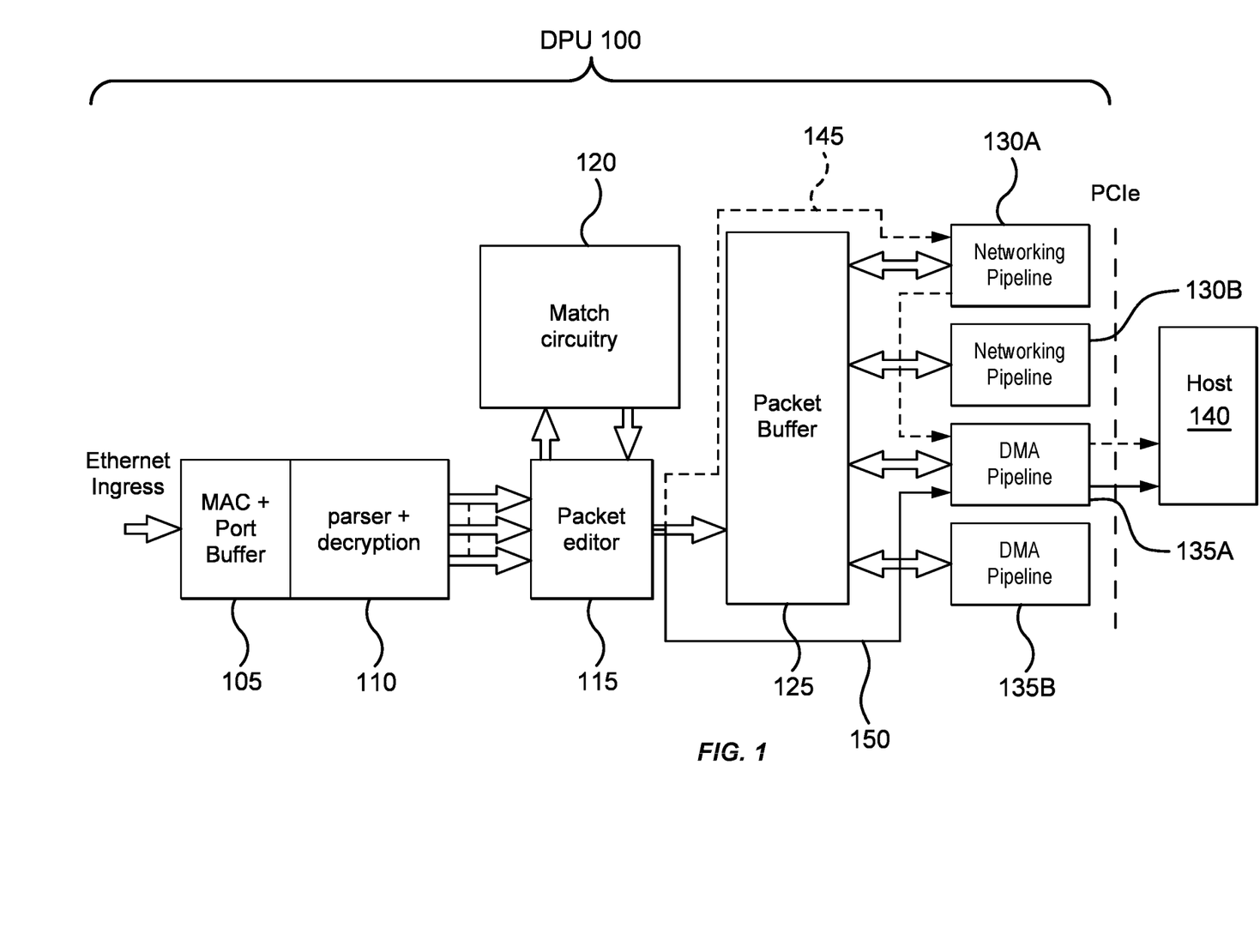
FIG. 1 illustrates a DPU that can bypass a networking pipeline, according to an example.

FIG. 1 illustrates a DPU 100 that can bypass a networking pipeline 130, according to an example. In one embodiment, the DPU 100 is in a NIC, such as a SmartNIC, but the DPU may be integrated into other hardware components besides a NIC.

FIG. 1 illustrates an ingress path where Ethernet packets are received from a network (e.g., the Internet or a local area network (LAN)), processed by the DPU 100, and then forwarded to a host 140 (e.g., a CPU or GPU) via a PCIe connection. Notably, FIG. 1 does not illustrate an egress path where the host 140 uses the DPU 100 to transmit Ethernet packets onto the network.

The received packets are first received at a MAC/Port buffer 105 and then parsed and decrypted by a parser/decryption circuit 110. The parsed packet is then forwarded to a packet editor 115 which includes circuitry for editing the received packet so that the packet can bypass the networking pipelines 130 and be directly processed by one of the DMA pipelines 135.

To determine whether a received packet should bypass the networking pipeline 130, the DPU 100 includes match circuitry 120 which determines whether the packet should be sent to a networking pipeline 130 or to one of the DMA pipelines 135. For example, FIG. 1 illustrates path 145 where the packet editor 115 (based on information provided by the match circuitry 120) forwards a packet to the networking pipeline 130A where it is first processed before the packet is transmitted to the DMA pipeline 135A, and finally to the host 140. In contrast, path 150 illustrates the packet editor 115 forwarding a packet to the DMA pipeline 135A without being processed by any of the networking pipelines 130 in the DPU 100. That is, the path 150 illustrates bypassing the networking pipelines 130, which can reduce latency.

In one embodiment, the match circuitry 120 can be specialized circuitry for determining whether a packet should bypass the networking pipelines 130. One example of specialized circuitry is described in FIG. 4 below. However, in another embodiment, the match circuitry 120 can be implemented using a processor, such as a x86 processor core. Thus, the embodiments herein are not limited to a particular implementation for the match circuitry 120.

In one embodiment, the match circuitry receives a packet header vector (PHV) for the received packet. For example, the parser and decryption circuit 110 may parse out the PHV from a received packet, which is then forwarded to the match circuitry 120 via the packet editor 115. As described in more detail in FIGS. 2 and 3 below, the match circuitry 120 can use the PHV to determine whether the corresponding packet should bypass the networking pipeline 130. If so, the match circuitry 120 can insert commands into the PHV for the packet editor 115 and then forward the edited PHV to the packet editor 115. The packet editor 115 can then perform the commands in order to prepare the packet to be processed by the DMA pipeline 135, rather than being first processed by one of the networking pipelines 130.

However, in another embodiment, instead of the packet first being received at the packet editor 115 before the editor 115 forwards the PHV to the match circuitry 120, the entire packet could first be received at the match circuitry 120 which can then provide the packet and the edited PHV to the packet editor.

In addition to determining whether a packet should bypass the networking pipeline 130, in one embodiment the match circuitry 120 determines the particular pipeline the packet should be sent to by the packet editor 115. For example, regardless whether the match circuitry 120 determines that a packet should be first sent to a networking pipeline 130 or first to a DMA pipeline 135, the match circuitry 120 can assign the packet to a certain pipeline for load balancing. For example, the match circuitry 120 can store a lookup table that assigns packets based on a range of flow IDs, sources, destinations, or the like, to the different networking and DMA pipelines 130, 135 in the DPU 100. Performing load balancing with the match circuitry is discussed in more detail in FIG. 6 below.

Figure 2:
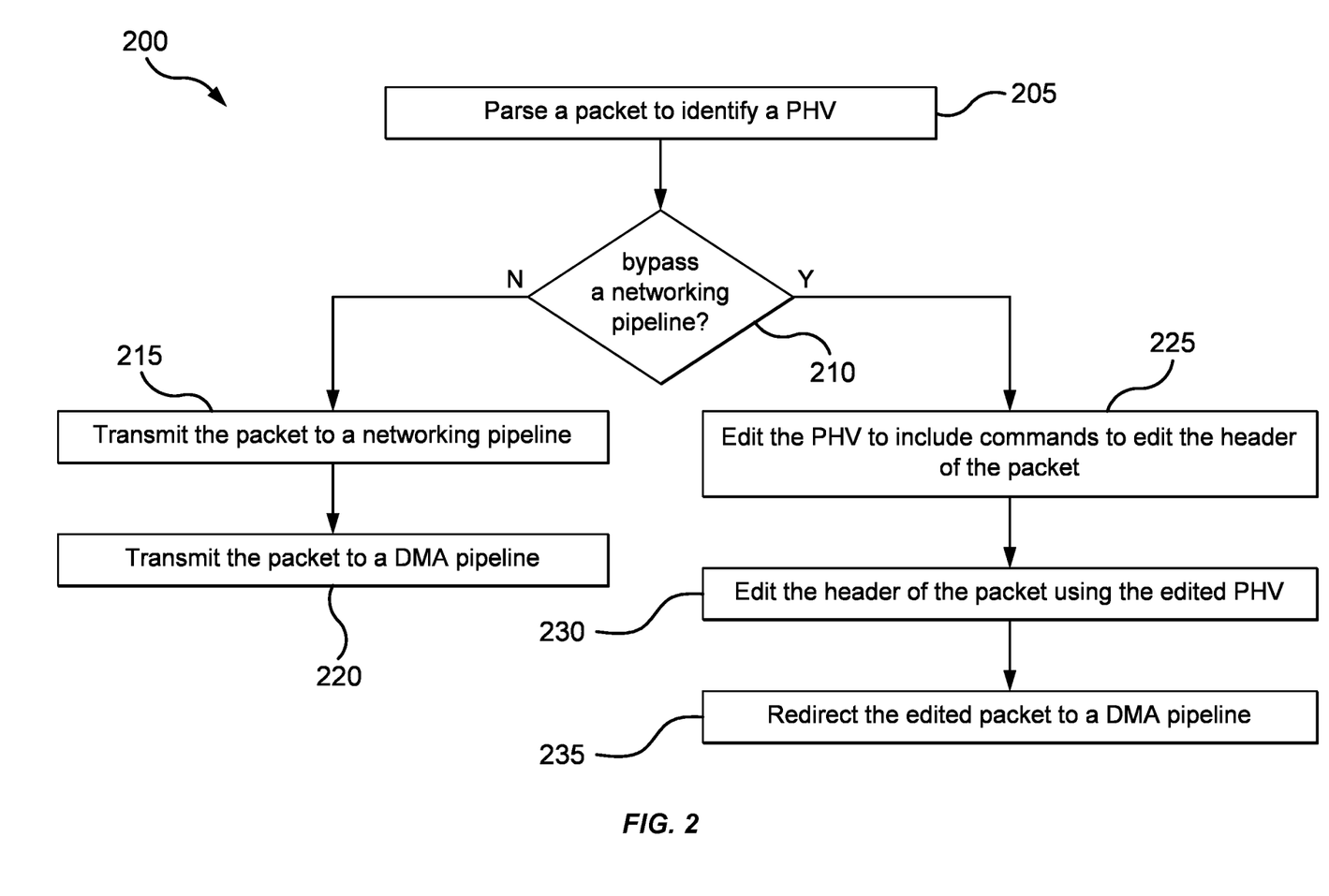
FIG. 2 is a flowchart for bypassing a networking pipeline, according to an example.

FIG. 2 is a flowchart of a method 200 for bypassing a networking pipeline, according to an example. For ease of explanation, the method 200 is discussed in tandem with the DPU 100 described in FIG. 1 as well as FIG. 3 which illustrates editing packet headers when bypassing a networking pipeline.

Figure 3:
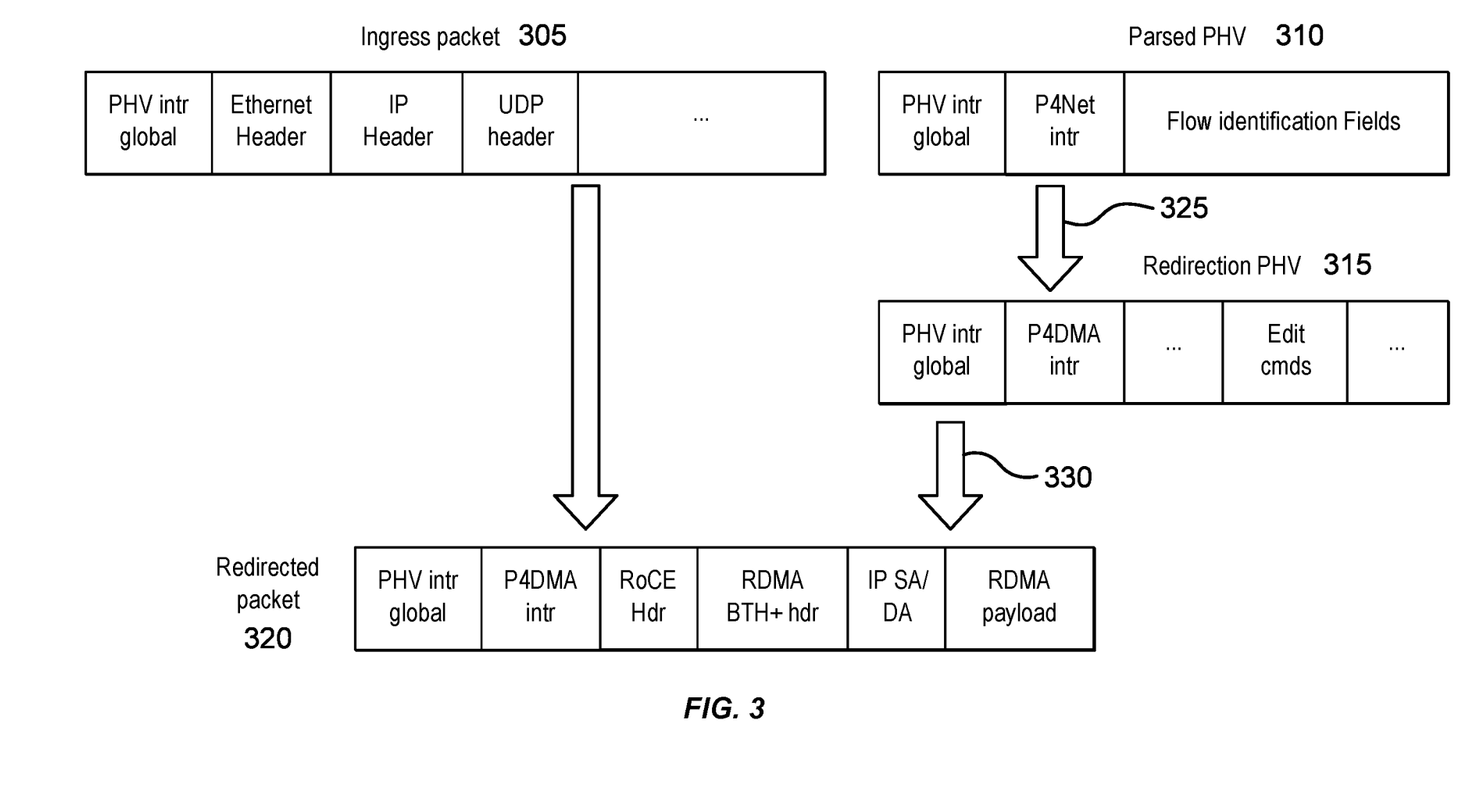
FIG. 3 illustrates editing packet headers when bypassing a networking pipeline, according to an example.

At block 205, a parser in the DPU (e.g., the parser and decryption circuit 110 in FIG. 1) parses a received packet to identify a PHV in the packet. For example, the parser can receive an ingress packet 305 in FIG. 3 to identify a parsed PHV 310. The parsed PHV 310 includes a PHV intrinsic (intr) global value, a P4Net intr value, and flow identification fields corresponding to the packet 305. Notably, FIG. 3 illustrates a PHV 310 that is compatible with the P4 programming language for controlling packet forwarding planes in network devices. That is, P4 is a domain-specific language for describing how packets are processed by a network data plane. A P4 program comprises an architecture, which describes the structure and capabilities of the pipeline, and a user program, which specifies the functionality of the programmable blocks within that pipeline. The embodiments herein can be compatible with the Portable NIC Architecture (PNA) which is an architecture that describes the structure and common capabilities of network interface controller (NIC) devices that process packets going between one or more interfaces and a host system. However, the embodiments herein are not limited to any particular type of programming language used to establish the networking and DMA pipelines.

The parsed PHV is then transmitted to the match circuitry 120. For example, the packet editor 115 can receive the parsed PHV from the parser and then forward the PHV to the match circuitry 120.

At block 210, the match circuitry determines whether the packet should bypass the networking pipelines in the DPU, and instead be transmitted to a DMA pipeline. In one embodiment, the match circuitry determines a type of the packet to determine whether the packet should bypass the networking pipelines. For example, the match circuitry may determine whether the received packet, using the information in the parsed PHV, is a RDMA packet. The match circuitry can evaluate various types of information within the parsed PHV such as application type, flow identification, along with program-specified fields to determine whether the packet should bypass the networking pipelines.

Assuming the match circuitry determines the packet should not bypass the networking pipeline, the method 200 proceeds to block 215 where the match circuitry instructs the packet editor to transmit the packet to a networking pipeline. The networking pipeline can perform any number of networking tasks based on information in the packet.

In one embodiment, after the packet is processed by the networking pipeline, at block 220 the DPU transmits the packet from the output of the networking pipeline to a DMA pipeline. The DMA pipeline can then perform any number of DMA tasks using the information in the packet. Once the packet is processed by the DMA pipeline, the packet may be transmitted to the host. That is, blocks 215 and 220 correspond to a packet that follows the path 145 in FIG. 1.

Returning to block 210, if the match circuitry determines that the packet should bypass the networking pipeline, the method instead proceeds to block 225 where the match circuitry edits the PHV to include commands for the packet editor to edit the header of the packet. For example, FIG. 3 illustrates (as shown by the arrow 325) the match circuitry editing the parsed PHV 310 to generate a redirection PHV 315 which includes a P4DMA intr value and edit commands (cmds). That is, in this example, the match circuitry replaces the P4Net intr value in the parsed PHV 310 with a P4DMA intr value. The match circuitry The match circuitry, one, indicates to the editor that packet should be transmitted to a DMA pipeline, and two, generates values as input to the DMA pipeline (which includes the P4DMA intr value) and that the editor uses in order to prepare values before redirecting the packet to DMA pipeline. In addition, the redirection PHV 315 includes edit cmds which were not in the parsed PHV 310.

At block 230, the packet editor receives the edited PHV from the match circuitry and edits the header of the packet using the commands in the edited PHV. This is illustrated in FIG. 3 by the arrow 330 where the packet editor uses the edit cmds in the redirection PHV 315 provided by the match circuitry to generate a redirected packet 320, which includes a modified header relative to the original ingress packet 305.

As shown, the redirected packet 320 has a header that includes the P4DMA intr value which tells the packet editor that the packet 320 should be sent a DMA pipeline. Also, the header in the redirected packet 320 includes data that was added as a result of the packet editor performing the edit cmds in the redirection PHV 315—i.e., a RoCE header (Hdr), RDMA base transport header (BTH)+hdr, and IP source address (SA)/destination address (DA). That is, FIG. 3 illustrates that the packet editor can use the original ingress packet 305 along with the redirection PHV 315 to generate the redirected packet 320. In this case, the redirected packet 320 is ready to be processed by one of the DMA pipelines in the DPU, without first being processed by a networking pipeline.

At block 235, the packet editor redirects the edited packet (e.g., the redirected packet 320) to the DMA pipeline for processing. Thus, block 235 can correspond to the path 150 in FIG. 1.

Figure 4:
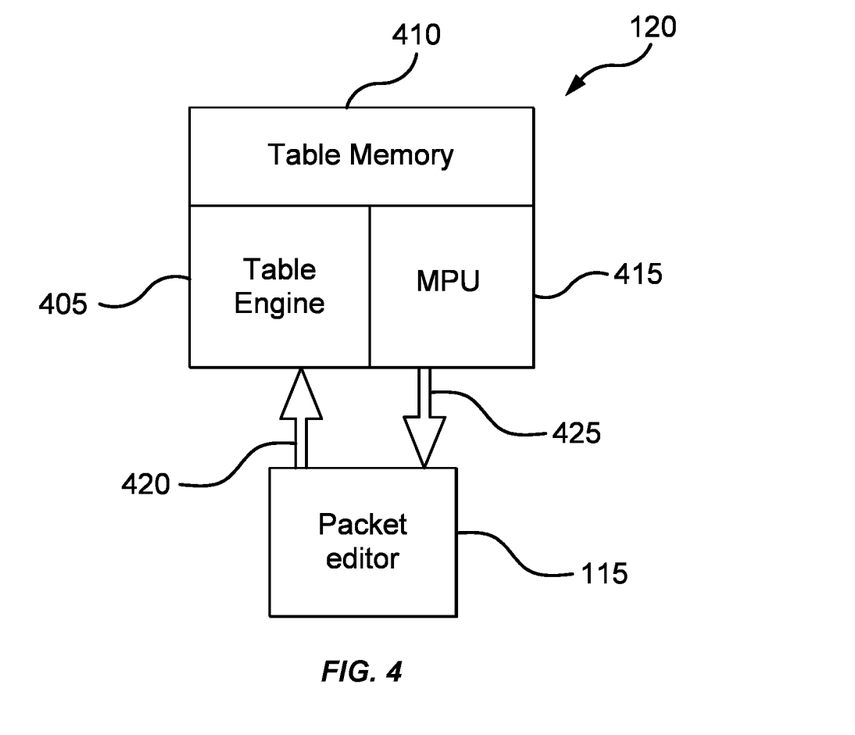
FIG. 4 is one example of match circuitry for determining when to bypass a networking pipeline, according to an example.

FIG. 4 is one example of match circuitry 120 for determining when to bypass a networking pipeline, according to an example. In this implementation, the match circuitry 120 is formed from specialized circuitry which includes a table engine 405, table memory 410, and a match processing unit (MPU) 415. The table engine 405 receives the parsed PHV from the packet editor as shown by the arrow 420. The table engine 405 can then launch a lookup into the table memory 410 using application type, flow identification, program-specified fields, and combinations thereof to determine whether the packet should bypass the networking pipeline in the DPU. For example, the table memory 410 can be configured to match certain types of data in the parsed PHV when the packet is a particular type (e.g., a RDMA packet) that can bypass the networking pipelines.

In one embodiment, the table memory 410 stores store state information, such one or more policers for rate limiting purposes. The policers can indicate whether a flow, virtual machine, or host associated with the packet has exceeded a data or packet rate. The results of the lookup into the table memory 410 can return this state information to the MPU 415 along with whether the packet should bypass the networking pipeline.

In one embodiment, the MPU 415 is capable of running P4 programs natively. The MPU 415 can handle classic P4 functions such as packet parsing, manipulation, tunneling, and access control lists (ACLs). P4 programs can implement (periodic) timer events, handle asynchronous events triggered by state transitions, generate notifications, craft and send packets inline (e.g., IPFIX), etc., making it possible to implement complex stateful features and custom network protocols natively in the P4 data path. For example, network functions like TCP/TLS proxies, NVME over TCP, IPsec, Active-Active or Active-Passive HA state machines, and flow aging can be implemented inline in the fast path processors. Although the DPU can include general-purpose CPU cores, in one embodiment, using the MPU 415 to implement the match circuitry 120 can result in fast path data traffic, thus providing both programmability and performance at the same time, since utilization of CPUs as the match circuitry 120 can degrade the fast path performance, scale, throughput (as measured by packets per second or PPS), and latency.

Figure 5:
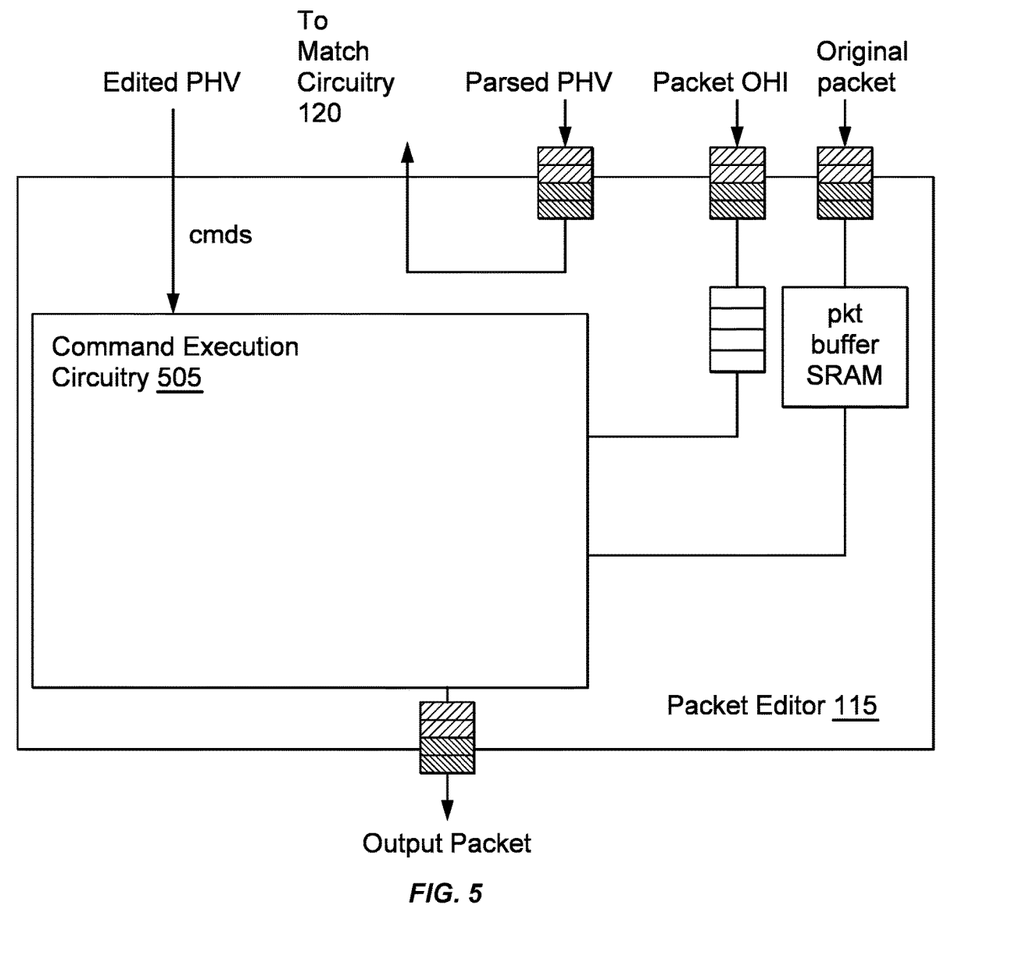
FIG. 5 illustrates a packet editor for a DPU, according to an example.

In one embodiment, the MPU 415 writes specific edit commands (e.g., the edit cmds illustrated in FIG. 3) to the PHV, based on which the packet editor constructs the packet (e.g., the redirected packet 320 in FIG. 3) by copying and modifying portions of the original ingress packet 305 and the MPU-modified PHV (e.g., the redirection PHV 315). FIG. 5 illustrates the details of the edit commands and the packet editor.

FIG. 5 illustrates a packet editor 115 for a DPU, according to an example. The implementation of the packet editor 115 shown in FIG. 5 is just one example of circuitry for performing the functions described above.

The top right of FIG. 5 illustrates three inputs to the packet editor 115 which include the parsed PHV, a packet original header information (OHI), and the original received packet. As shown, the packet editor 115 forwards the parsed PHV to the match circuitry 120 (e.g., the table engine 405 in FIG. 4 or a CPU within the DPU). The packet OHI can categorize the packet by the different layers in the packet which can be used when editing the packet as discussed below. The packet OHI can be a specific type of metadata describing the original packet in the architecture. For packet editor purpose, it contains a group of {offset, length} pairs describing the various packet header fields.

The top left of FIG. 5 illustrates a fourth input to the packet editor 115 where the editor 115 receives the edited PHV from the match circuitry (e.g., the redirection PHV 315 in FIG. 3). The packet editor 115 includes command execution circuitry 505 for performing the edit commands in the edited PHV. That is, the commands can instruct the command execution circuitry 505 how it should use the packet OHI and the original packet (which is buffered in the packet editor 115) to generate an edited output packet (e.g., a redirection packet 320 in FIG. 3) that can be transmitted to a DMA pipeline.

The edit commands can include several categories of commands such as a first category that copy from the PHV provided by the match circuitry to the output packet, a second category that copy from the original ingress packet to the output packet, and a third category for handling serial commands which have multiple actions. Regarding the third category, typically packet processing uses a table to perform dependent actions (first perform Action 1 then perform Action 2) but since the packet editor 115 may have a single stage of match action, serial actions cannot be performed in that case. Instead, override and jump commands can be used to perform serial actions. Examples of these three types of commands are now discussed.

phv2pkt_intr (0x1): Special command for intrinsic global and intrinsic P4DMA with table action resolution. This resolves LIF, tm_oprt and tm_oq between Tenant Identification and RDMA forwarding lookup.

phv2pkt (0x2): Copy from match circuitry provided PHV to outgoing packet.

Pkt2pkt_ohi (0x3): Copy from original ingress packet to outgoing packet, as specified by OHI command, e.g., an OHI {offset, len} tuple.

Pkt2pkt_bytes (0x4): Copy from input packet to outgoing packet, as specified by byte offset and length.

pkt_ovrd (0x5): override constructed data from immediately previous edit command, can be used as generic action resolution mechanism.

Jump (0x6): jump forward to skip a number of commands.

Figure 6:
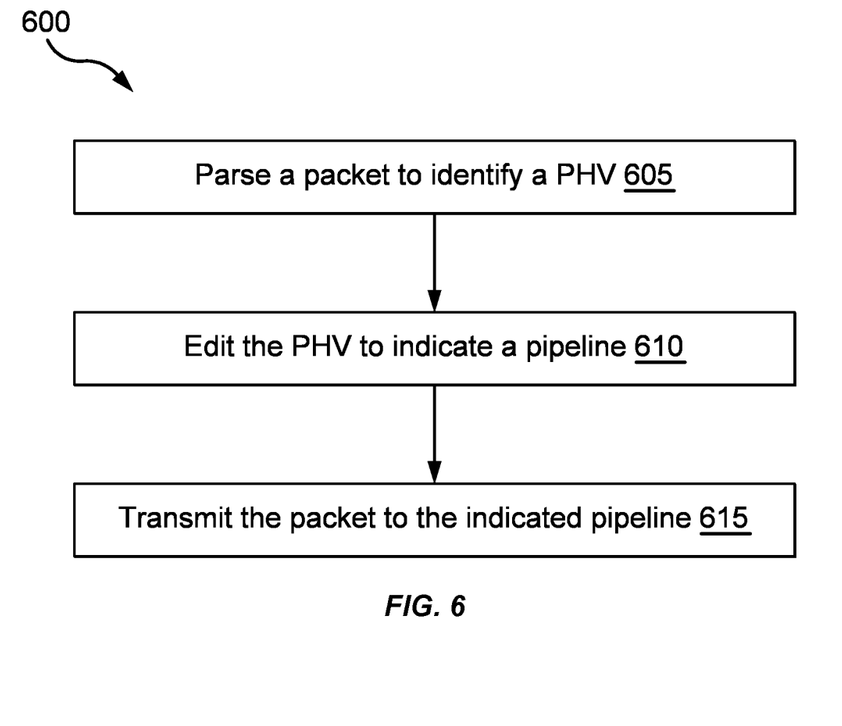
FIG. 6 is a flowchart for performing load balancing between different networking and DMA pipelines, according to an example.

FIG. 6 is a flowchart of a method 600 for performing load balancing between different networking and DMA pipelines, according to an example. At block 605, a parser in the DPU (e.g., the parser and decryption circuit 110 in FIG. 1) parses a received packet to identify a PHV in the packet. Block 605 can be the same as block 205 in the method 200 in FIG. 2. For example, the parser can receive an ingress packet 305 in FIG. 3 to identify a parsed PHV 310. The parsed PHV is then transmitted to the match circuitry 120. For example, the packet editor 115 can received the parsed PHV from the parser and then forward the PHV to the match circuitry 120. Thus, the method 600 can be performed in parallel with the method 200 in FIG. 2.

At block 610, the match circuitry edits the PHV to indicate a pipeline that should receive the packet. For example, if the match circuitry determines at block 210 to not bypass a networking pipeline, the match circuitry can then select which of a plurality of networking pipelines in the DPU should receive the packet. Similarly, if the match circuitry determines at block 210 to bypass a networking pipeline, the match circuitry can then select which of a plurality of DMA pipelines in the DPU should receive the packet.

The match circuitry can evaluate information such as a flow ID, destination, or source associated with a packet to assign the packet to a particular one of the networking pipeline (assuming it should be processed by both the networking and DMA pipelines) or a particular one of the DMA pipelines (assuming it should be processed by only a DMA pipeline). This information can be stored within the parsed PHV. The embodiments herein are not limited to any particular type of information in the parsed PHV so long as the information can be used to perform load balancing between the pipelines in the DPU.

In one embodiment, the match circuitry can be configured (before operation) to assign packets to different networking/DMA pipelines based on different, non-overlapping ranges of flow IDs. Or the match circuitry can be configured to assign packets to different networking/DMA pipelines based on different source or destination addresses. Moreover, if during operation the DPU determines that one pipeline is receiving too many of the packets, the DPU can adjust the configuration information so that the packets are better distributed among the pipelines. That is, the configuration information used to perform load balancing can be dynamically adjusted.

In one embodiment, the configuration information is stored in the table memory 410 in FIG. 4. Based on a lookup performed in the table memory 410, the MPU 415 can evaluate the results and then edit the PHV (e.g., the redirection PHV 315) which includes information that informs the packet editor which specific networking or DMA pipeline should receive the packet.

At block 615, the packet editor receives the edited PHV from the match circuitry and transmits the packet to the indicated pipeline. In this manner, the method 600 can occur in parallel with the method 200. That is, the match circuitry can perform load balancing to determine which pipeline should receive the packet while it determines whether the packet should be sent to a networking pipeline or to a DMA pipeline, thereby bypassing the networking pipelines.

Latency-sensitive applications (e.g., RDMA applications), especially in a cloud computing environment, can be encapsulated in different formats, though typically involve much less complex algorithm processing. In the embodiments described above, ingress packets are passed to match circuitry (e.g., a P4-programmable MPU), which goes through fast table lookup and prepares edit command to the associated packet editor. Latency-sensitive packets are rewritten in a way that can be delivered to a DMA pipeline directly while packets that require further processing are first directed to one of the networking pipelines. The architecture also enables mechanisms for load-balancing between the multiple internal processing pipelines in the DPU.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A data processing unit (DPU), comprising:
   a networking pipeline;
   a direct memory access (DMA) pipeline;
   a parser circuit configured to parse a received packet to identify a packet header vector (PHV); and
   match circuitry configured to, based on receiving the PHV:
      determine that the received packet should bypass the networking pipeline; and
      edit the PHV to indicate the received packet should be transmitted to the DMA pipeline.

2. The DPU of claim 1, wherein the match circuitry is configured to:
   edit the PHV to include commands; and
   provide the edited PHV to a packet editor in the DPU.

3. The DPU of claim 2, wherein the packet editor comprises circuitry configured to:
   perform the commands to edit a header of the received packet; and
   forward the received packet with the edited header to the DMA pipeline, wherein the received packet is not processed by any networking pipeline in the DPU.

4. The DPU of claim 3, wherein the parser circuit is configured to parse a second received packet to identify a second PHV,
   wherein the match circuitry is configured to, based on receiving the second PHV, determine that the second received packet should not bypass the networking pipeline,
   wherein the packet editor is configured to forward the second received packet to the networking pipeline,
   wherein the networking pipeline is configured to forward the second received packet to the DMA pipeline when finished processing the second received packet.

5. The DPU of claim 4, further comprising:
   a plurality of networking pipelines which includes the networking pipeline; and
   a plurality of DMA pipelines which includes the DMA pipeline,
   wherein the match circuitry is configured to, based on the PHV, edit the PHV to indicate that the networking pipeline should receive the second received packet to perform load balancing between the plurality of networking pipelines.

6. The DPU of claim 1, wherein the match circuitry comprises:
- a table memory;
- a table engine comprising circuitry configured to perform a lookup into the table memory using data in the PHV; and
- a match processing unit (MPU) comprising circuitry configured to determine that the received packet should not bypass the networking pipeline using results of the lookup into the table memory and to edit the PHV to indicate the received packet should be transmitted to the DMA pipeline.

7. The DPU of claim 6, wherein the lookup into the table memory returns results that depend on state information stored in the table memory, wherein the state information comprises one or more policers for performing rate limiting.

8. A method comprising:
- parsing a received packet to identify a packet header vector (PHV);
- determining that the received packet should bypass a networking pipeline based on data in the PHV; and
- editing the PHV to indicate the received packet should be transmitted to a DMA pipeline rather than the networking pipeline.

9. The method of claim 8, further comprising:
- editing, before transmitting the received packet to the DMA pipeline, the PHV to include commands;
- performing the commands to edit a header of the received packet; and
- forwarding, after the commands have been performed, the received packet with the edited header to the DMA pipeline, wherein the received packet is not processed by any networking pipeline.

10. The method of claim 8, further comprising:
- parsing a second received packet to identify a second PHV;
- determining, based on the second PHV, that the second received packet should not bypass the networking pipeline; and
- forwarding the second received packet to the networking pipeline; and
- forwarding the second received packet to the DMA pipeline when the networking pipeline is finished processing the second received packet.

11. The method of claim 10, further comprising, before forwarding the second received packet to the networking pipeline:
- determining, based on the second PHV, which of a plurality of networking pipelines should receive the second received packet to perform load balancing.

12. The method of claim 8, wherein determining that the received packet should bypass the networking pipeline based on data in the PHV is performed by a MPU in a DPU.

13. The method of claim 12, wherein the DPU is in a network interface controller/card (NIC).

14. A network interface card (NIC), comprising:
- a networking pipeline;
- a DMA pipeline;
- a parser circuit configured to parse a received packet to identify a packet header vector (PHV); and
- match circuitry configured to, based on receiving the PHV:
- determine that the received packet should bypass the networking pipeline; and
- edit the PHV to indicate the received packet should be transmitted to the DMA pipeline.

15. The NIC of claim 14, wherein the match circuitry is configured to:
- edit the PHV to include commands; and
- provide the edited PHV to a packet editor in the NIC.

16. The NIC of claim 15, wherein the packet editor comprises circuitry configured to:
- perform the commands to edit a header of the received packet; and
- forward the received packet with the edited header to the DMA pipeline, wherein the received packet is not processed by any networking pipeline in the NIC.

17. The NIC of claim 16, wherein the parser circuit is configured to parse a second received packet to identify a second PHV,
- wherein the match circuitry is configured to, based on receiving the second PHV, determine that the second received packet should not bypass the networking pipeline,
- wherein the packet editor is configured to forward the second received packet to the networking pipeline, wherein the networking pipeline is configured to forward the second received packet to the DMA pipeline when finished processing the second received packet.

18. The NIC of claim 17, further comprising:
- a plurality of networking pipelines which includes the networking pipeline; and
- a plurality of DMA pipelines which includes the DMA pipeline,
- wherein the match circuitry is configured to, based on the PHV, edit the PHV to indicate that the networking pipeline should receive the second received packet to perform load balancing between the plurality of networking pipelines.

19. The NIC of claim 14, wherein the match circuitry comprises:
- a table memory;
- a table engine comprising circuitry configured to perform a lookup into the table memory using data in the PHV; and
- a MPU comprising circuitry configured to determine that the received packet should not bypass the networking pipeline using results of the lookup into the table memory and to edit the PHV to indicate the received packet should be transmitted to the DMA pipeline.

20. The NIC of claim 19, wherein the lookup into the table memory returns results that depend on state information stored in the table memory, wherein the state information comprises one or more policers for performing rate limiting.

* * * * *